United States Patent [19]

Pallant et al.

[11] 4,159,095
[45] Jun. 26, 1979

[54] SEAT HEIGHT ADJUSTMENT MECHANISM

[75] Inventors: Joseph Pallant, Albrighton; John P. Johndrow, Wildwood, both of England

[73] Assignee: H. R. Turner (Willenhall) Limited, Walsall, England

[21] Appl. No.: 865,911

[22] Filed: Dec. 30, 1977

[30] Foreign Application Priority Data

Feb. 4, 1977 [GB] United Kingdom ............... 4588/77

[51] Int. Cl.² ........................................... F16M 11/12
[52] U.S. Cl. ..................................... 248/396; 248/421
[58] Field of Search ............... 248/396, 397, 394, 395, 248/421, 422, 371

[56] References Cited

U.S. PATENT DOCUMENTS

| 3,079,118 | 2/1963 | Pickles | 248/421 |
| 3,460,793 | 8/1969 | Dosh | 248/421 |
| 3,662,984 | 5/1972 | Robinson et al. | 248/394 |
| 4,073,459 | 2/1978 | Pickles | 248/394 |

FOREIGN PATENT DOCUMENTS 2206884  9/1973  Fed. Rep. of Germany ........... 248/371

Primary Examiner—Robert A. Hafer
Attorney, Agent, or Firm—Marshall & Yeasting

[57] ABSTRACT

A seat height adjustment mechanism comprises a seat base frame mounted on a supporting fixture by means of front and rear sets of levers to enable the vertical height of the front and rear ends of the seat base to be adjusted relative to the fixture. Angular adjustment of the front and rear levers is effected by means of respective gear sets at opposite sides of the seat. The gear set associated with the front end of the seat base can be operated directly by the seat occupant and the two gear sets are linked by a selectively operable clutch device so that the rear end gear set can be operated simultaneously with the front end gear set if the clutch is in the operative condition. In this way, the seat is raised or lowered bodily at both ends. When the clutch is inoperative, the rear end gear set is not operated and only the front end of the seat is then raised or lowered.

6 Claims, 3 Drawing Figures

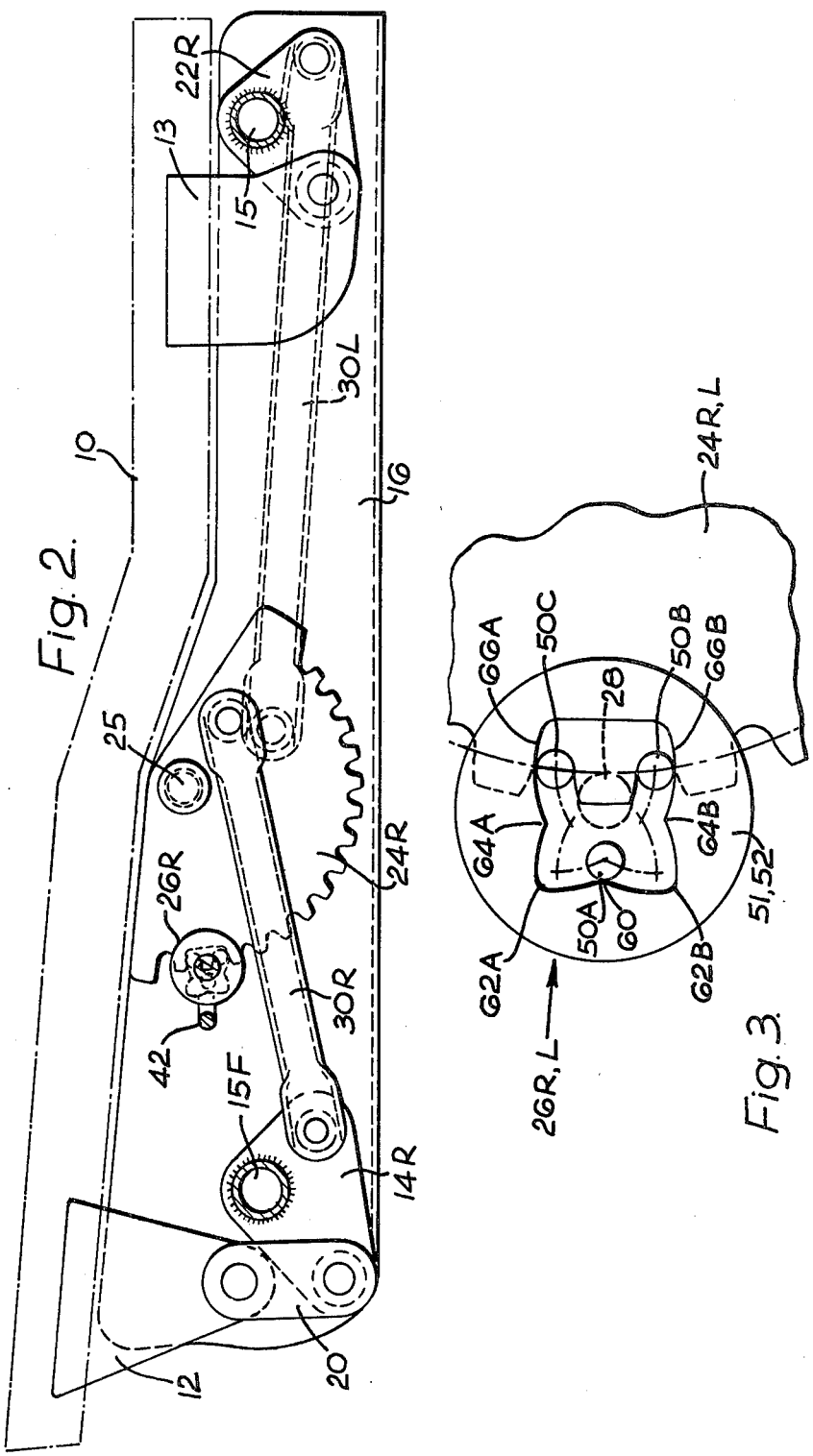

SEAT HEIGHT ADJUSTMENT MECHANISM

This invention relates to a seat height adjustment mechanism to enable the height of a seat in a vehicle for example to be adjusted relative to the vehicle floor, according to the requirements of the seat occupant.

According to the present invention we provide a seat height adjustment mechanism for raising and lowering the base of a seat relative to a fixture, comprising a lever arrangement comprising front and rear levers for mounting the seat base adjacent its front and rear for vertical adjustment relative to said fixture, and a user operable gear means mounted on said fixture or the seat base and having independent connections with the front levers and rear levers respectively whereby operation of the gear means is translated into turning of said front and/or rear levers and hence vertical adjustment of the seat base. Preferably said gear means has two modes of operation, a first mode in which the front and rear levers are operated together to raise or lower the seat base generally parallel to said fixture, and a second mode in which only the front levers or only the rear levers are turned angularly thereby raising or lowering the front or rear of the seat base only.

Preferably the gear means is self-locking so that a separate locking device is not needed to hold the gear means in a selected position of adjustment.

The invention will now be described by way of example only with reference to the accompanying drawings in which:

FIG. 2 is a side elevation of the seat shown in FIG. 1; and

FIG. 3 is an enlarged diagrammatic view of a pinion and rack construction forming part of the mechanism.

Figure 1:
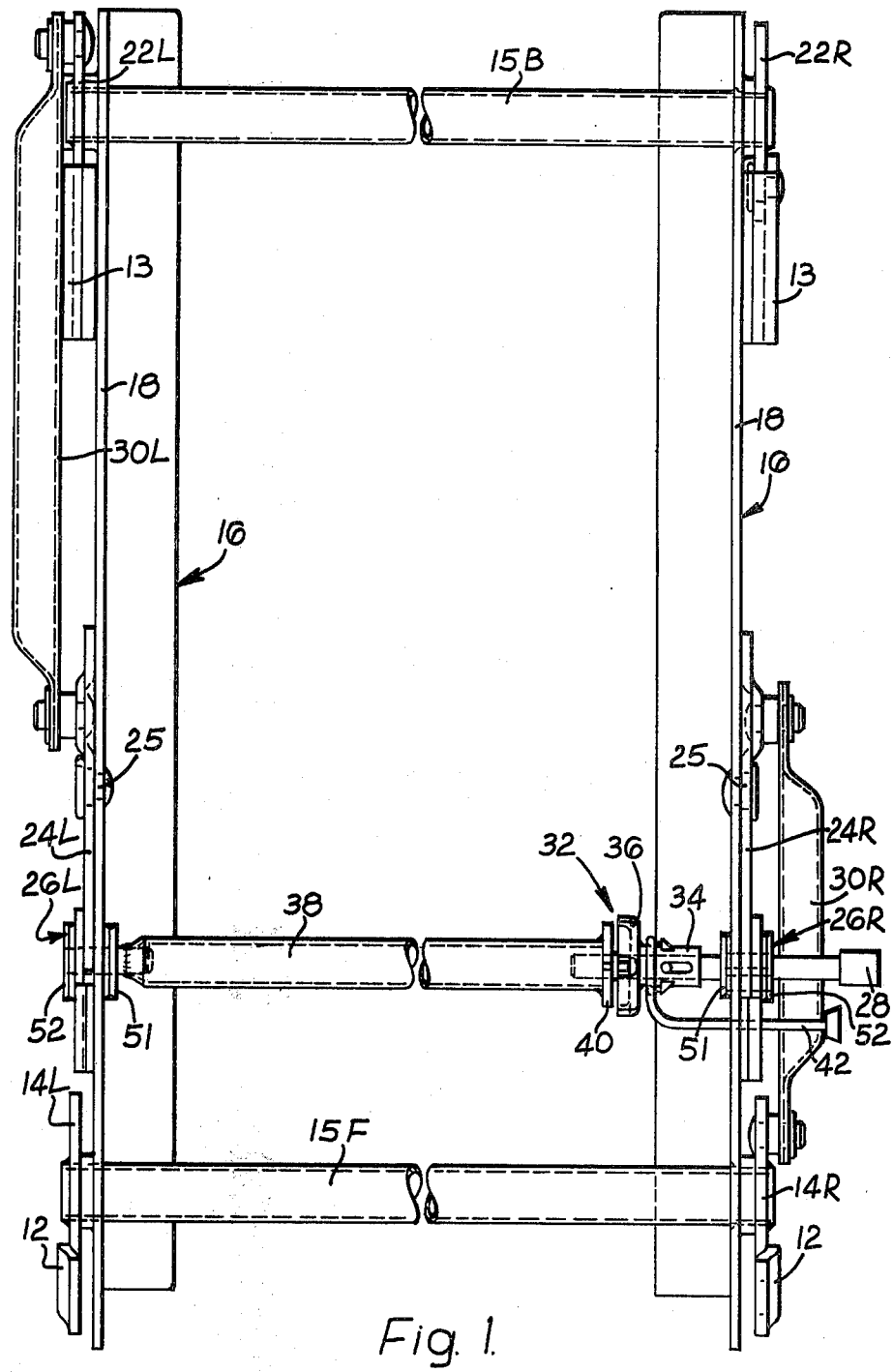
FIG. 1 is a plan elevation of one form of height adjustment mechanism according to the invention.

The illustrated embodiment comprises a seat base 10 (shown in outline in FIG. 2) which may comprise a generally rectangular framework and which is mounted on fixtures 16 extending beneath opposite sides of the base 10. The fixtures 16 can either be secured directly to the floor or they may be mounted on the floor via adjustable slideways to enable the seat to be adjusted longitudinally of the vehicle. The front of the base 10 is mounted on the fixtures 16 by arms 12 which are coupled to bell crank levers 14R, L via links 20 and the levers 14 are coupled together by a torque tube 15F journalled inside walls 18 of the fixtures 16. The rear of the base 10 is mounted on fixtures 16 by arms 13 pivoted directly to bell crank levers 22R, L which are coupled together by torque tube 15B journalled in the side walls 18.

Midway between its ends, each fixture 16 mounts a gear sector 24R, L via pivot 25, each of which sectors can be turned angularly by a respective pinion device 26R, L operable, as explained hereinafter, by a handle (not shown) mounted on a spindle 28. Sector 24R is connected to lever 14R by link 30R and sector 24L is connected to lever 22L by link 30L. Turning of sector 24R is therefore effective to raise or lower the front end of the base 10 via levers 14R, L whilst turning of sector 24L is effective to raise or lower the rear end of the base via levers 22L, R. The spindle 28 is directly coupled to the pinion 26R and is coupled to pinion 26L via a selectively operable clutch arrangement 32 comprising a sleeve 34, which is axially slidable on the spindle 28 and terminates in a cap shaped member 36, and a tube 38 which is rotatably fast at one end with the pinion 26L and has an element 40 at its other end which can interfit with the member 36 in drive transmitting relation therewith. The sleeve 34 is displaceable by a user controlled rod 42 between the inoperative position shown in FIG. 1 in which the parts 36 and 40 are separated and an operative position in which they are interengaged to transmit drive from spindle 28 to the pinion 26L via tube 38. When the clutch is inoperative therefore only sertor 24R is turned by the spindle 28 with consequent raising or lowering of the front end only (which in effect adjusts the inclination of the seat base). When the clutch is operative, sectors 24R, L are turned simultaneously with consequent raising and lowering of the seat base at the front and rear, i.e. the seat base effectively rises or falls generally parallel to the fixture 16.

This embodiment provides for both inclination adjustment and wholesale raising and lowering of the seat base. In some cases, however, the inclination adjustment facility may not be required. In this event, the clutch arrangement 32 and the links 20 can be omitted, and it is also possible to use only one gear sector by linking both sets of levers 14, 22 to the same gear sector. In a modification of the illustrated embodiment and the simplified embodiment just referred to, the gear sector and pinion arrangement or arrangements and the lever arrangements may be provided on the seat base instead of the fixtures and the arms 12, 13 may, in this instance, be connected directly to the fixtures.

Although various gearing arrangements can be used for effecting turning of the levers, it is preferred to use a gearing arrangement of the kind which is self-locking, one example of which is the worm-type gear drive, because this obviates the need for a separate locking device to maintain the selected adjustment. A conventional pinion and rack would not suffice for this purpose. In the illustrated embodiment, each pinion is mounted in a guide aperture 58 in the respective fixture 16 for movement radially of the associated sector 24R, L and comprises three parallel pins 50A, B and C supported between discs 51, 52 and spaced equiangularly about the rotary axis of spindle 28. The pinion device is radially moveable under the action of spring loading which biases the device into the illustrated stable, locking position (see particularly FIG. 3) where two of its pins seat firmly within adjacent intertooth spaces of the sector and resist any tendency for the latter to rotate about pivot 25 due to the load exerted on the seat base.

The aperture 58 includes a crest 60, a concavity 62A and B on each side of the crest 60 and radiused cusps 64A and B having surfaces 66A and B whose curvatures at least approximate those of the tooth flanks. To illustrate operation of the device, suppose that it is desired to rotate the segment 24R clockwise from the illustrated position, then it will be necessary to rotate pinion 26R counterclockwise by means of a handle coupled to spindle 28. Initially, rotation of the pinion 26R about spindle 28 will be translated into a radial shifting movement caused by turning of the pinion about the pin 50B which remains in engagement with the segment 24R whilst the pin 50C moves out of engagement. Surface 66A assists in constraining the pinion to move in this manner. At this stage, no movement of the segment 24R occurs. Eventually, pin 50A engages with, and seats in, concavity 62B and further rotation of the pinion is translated into a turning movement about the pin 50A with consequent displacement of the pin 50B and rotation of the segment. Such movement continues until the pinion 50C engages with, and seats in, the concavity 62A whereupon the rotation of the pinion is translated into turning movement about the pin 50C with continued turning of the sector 24R by pin 50B and accompanying movement of the pin 50A towards meshing engagement with the sector. As the pin 50A passes cusp 64B, the effective turning point of the pinion becomes pin 50B and as pin 50A enters the aligned intertooth space, the pin 50C moves into registry with the crest 60. The pinion has by then assumed the stable, locking position illustrated in FIG. 3. Thus, a 120° rotation of the pinion, the sector has been displaced through one tooth pitch.

It will be noted that the curvature of the surfaces 66A and B cooperates with the pins to resist unintended turning of the pinion and that the registry between the crest 60 and the adjacent pin provides a fail safe feature in the event of breakage of the spring loading the pinion radially inwardly.

In a modification of the illustrated embodiment, instead of direct engagement between the pins and the aperture 58 a cam can be provided having part circular lobes centered on the pins and being cooperable with the periphery of the profiled aperture 58 which will be suitably shaped for this purpose.

Having now described our invention what we claim is:

1. A seat height adjustment mechanism for raising and lowering the base of a seat relative to a fixture, comprising a lever arrangement comprising first and second sets of levers which mount the seat base adjacent its fore-and-aft ends for vertical adjustment relative to said fixture, first and second gear means located adjacent opposite sides of the seat base and each comprising a drive gear and a driven gear, the driven gear of the first gear means being connected to the first set of levers by a first fore-and-aft extending link and the driven gear of the second gear means being connected to the second set of levers by a second fore-and-aft extending link, user-actuable means for operating the drive gear of the first gear means and selectively-operable clutch means coupling the drive gears of said first and second gear means, whereby only the first drive gear or both the first and second drive gears are operated according to the operating condition of the clutch means.

2. A mechanism as claimed in claim 1 wherein the first and second driven gears each comprises an angularly adjustable toothed sector to which the respective first and second links are connected.

3. A mechanism as claimed in claim 1 in which the first and second drive gears have a self-locking meshing action with the respective driven gears.

4. A seat height adjustment mechanism for raising and lowering the base of a seat relative to a fixture, comprising a lever arrangement comprising first and second sets of levers which mount the seat base adjacent its fore-and-aft ends for vertical adjustment relative to said fixture, gear means located adjacent one side of the seat base at a fore-and-aft position intermediate the first and second sets of levers, the gear means comprising a user-actuable drive gear and a driven gear, a first fore-and-aft extending link providing a coupling between the driven gear and said first set of levers, and a second fore-and-aft extending link providing a coupling between the driven gear and the second set of levers whereby turning of the driven gear, in response to user-actuated rotation of the drive gear, is transmitted to the first and second sets of levers by the respective links to effect raising and lowering of the associated ends of the seat base.

5. A mechanism as claimed in claim 4 wherein the driven gear comprises an angularly adjustable toothed sector.

6. A mechanism as claimed in claim 4 in which the drive gear has a self-locking meshing action with the driven gear.

* * * * *